US006627326B2

(12) United States Patent
Chatterjee et al.

(10) Patent No.: US 6,627,326 B2
(45) Date of Patent: Sep. 30, 2003

(54) MANUFACTURING TECHNIQUE FOR MULTI-LAYERED STRUCTURE WITH MAGNET USING AN EXTRUSION PROCESS

(75) Inventors: Madhu Sudan Chatterjee, Saginaw, MI (US); Andrzej Marian Pawlak, Troy, MI (US); Vinod K. Sikka, Oak Ridge, TN (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/202,176

(22) Filed: Jul. 24, 2002

(65) Prior Publication Data

US 2002/0187362 A1 Dec. 12, 2002

Related U.S. Application Data

(62) Division of application No. 09/567,110, filed on May 8, 2000, now Pat. No. 6,454,993.

(60) Provisional application No. 60/175,502, filed on Jan. 11, 2000.

(51) Int. Cl.[7] .............................. B22F 7/02; B22F 5/12; B32B 15/16; H01F 1/08; H01F 1/057

(52) U.S. Cl. ........................ 428/548; 428/611; 428/684

(58) Field of Search ........................ 419/6, 67; 428/548, 428/553, 557, 611, 615, 626, 624, 928, 633, 684; 335/296, 302, 297

(56) References Cited

U.S. PATENT DOCUMENTS 3,619,148 A 11/1971 Wilde ............................ 44/23
4,602,952 A 7/1986 Greene et al. ................ 75/228
4,617,726 A * 10/1986 Denk .......................... 29/598
4,881,984 A 11/1989 Chandhok et al. .......... 148/101
4,892,596 A * 1/1990 Chatterjee .................... 148/104
4,902,357 A 2/1990 Imaizumi .................... 148/101
4,960,469 A 10/1990 Tanigawa et al. ........... 148/105
5,000,796 A * 3/1991 Chatterjee ................... 148/101
5,002,677 A 3/1991 Srail et al. ............... 252/62.54
5,015,982 A 5/1991 Skinner et al. ............... 336/69
5,047,205 A * 9/1991 Chandhok et al. ............. 419/8
5,056,209 A 10/1991 Ohashi et al. ................ 29/517
5,069,866 A 12/1991 Ekbom .......................... 419/6
5,100,604 A 3/1992 Yamashita et al. .......... 264/115
5,221,503 A 6/1993 Ward et al. ................. 264/104
5,275,891 A * 1/1994 Tagaya et al. .............. 428/632
5,384,957 A 1/1995 Mohri et al. ............. 29/895.32
5,669,134 A 9/1997 Nogi et al. .................... 29/605
5,890,277 A 4/1999 Kliman ........................ 29/596
5,913,255 A 6/1999 Kikuchi et al. ............... 75/244
5,997,804 A 12/1999 Uchida et al. ................ 419/12
6,331,214 B1 * 12/2001 Koga et al. ................. 148/101

FOREIGN PATENT DOCUMENTS

| | | | |
|---|---|---|---|
| EP | 0261292 B1 | | 3/1988 |
| EP | 0392799 B2 | | 10/1990 |
| EP | 0565363 B1 | | 10/1993 |
| JP | 52-20903 | | 2/1977 |
| JP | 1-171215 | * | 7/1989 |
| JP | 03-283407 | | 12/1991 |
| JP | 04-042903 | | 2/1992 |

* cited by examiner

*Primary Examiner*—John J. Zimmerman
(74) *Attorney, Agent, or Firm*—Michael D. Smith

(57) ABSTRACT

An extruded magnetic structure includes a first layer of low alloy steel compressed powder and a second layer of rare earth metal compressed powder circumferentially disposed around the first layer. A third layer of compressed powder may be circumferentially disposed around the second layer.

23 Claims, 2 Drawing Sheets

MANUFACTURING TECHNIQUE FOR MULTI-LAYERED STRUCTURE WITH MAGNET USING AN EXTRUSION PROCESS

CROSS-REFERENCE TO RELATED APPLICATIONS

This application is a divisional application of U.S. patent application Ser. No. 09/567,110, file May 8, 2000, now U.S. Pat. No. 6,454,993. This application also claims the benefit of U.S. Provisional Patent Application No. 60/175,502, filed Jan. 11, 2000, the disclosure of which is incorporated by reference herein in its entirety.

FIELD OF THE INVENTION

This invention relates to a multi-layer structure permanent magnet and a method for manufacturing the same using an extrusion process to form the multi-layer structure.

BACKGROUND OF THE INVENTION

Permanent magnets are used in many applications. One such application is in the creation of brushless electric motors where they are used to replace the traditional alnico or ceramic magnets. Such magnets are useful, but are limited in terms of energy versus size. Higher energy in a smaller package is generally desirable in most industrial and commercial settings. Rare earth magnets, because of their extremely high energy, are finding increasing use in applications such as brushless DC motors.

The manufacture of rare earth magnets is a laborious and expensive process. As is described in U.S. Pat. No. 4,902,357, the production of rare earth magnets begins with sintering rare earth material. Following the sintering process, the magnet is solution treated and aged at elevated temperatures to achieve the desired magnetic properties.

Rare earth magnets are also very difficult to machine because they are mechanically hard and brittle. It is simply not practical to machine rare earth magnets or structures containing such magnets after they are magnetized during the manufacturing process steps, because the machined particles adhere strongly to the magnets. Because of the extremely high coercive forces of rare earth magnets it is also not practical to construct a magnetized rotor or stator of rare earth magnets and then remagnetize the structure as is commonly done with alnico magnets.

Because commercial desire is strong to employ rare earth magnets in applications such as DC brushless motors, the industry continues to look for methods of manufacturing rare earth magnets that are low in cost and are produced to near net shapes, thus having virtually no machining or relatively reduced machining.

SUMMARY OF THE INVENTION

The present invention is directed to an extrusion method for producing a multi-layered structure with high-energy ring magnets at low cost and which can be readily machined to its final size. More specifically, the invention is directed to a method for producing a multilayer rod having the desired magnetic properties and ease or limited need of machining.

In this invention an extrusion process is employed. A first layer of low alloy steel powder is injected into a chamber of an extrusion machine. A rare earth metal powder is then injected into the extrusion chamber to form a circumferentially disposed second layer around the first layer. The material so disposed in the extrusion chamber is then extruded through a die to form a rod with the concentric layering intact and having magnetic properties not found in the base materials A third layer, if desired, may be extruded around the rare earth metal at the same time. The third layer if used forms an outer skin of the extruded rod and protects the rare earth metal layer from mechanical fragmentation and corrosion. If a third layer is not desired an antioxidant coating may be applied. Then a stainless steel or an aluminum retention cap is inserted to provide protection against magnet integrity.

DETAILED DESCRIPTION OF THE INVENTION

Figure 1:
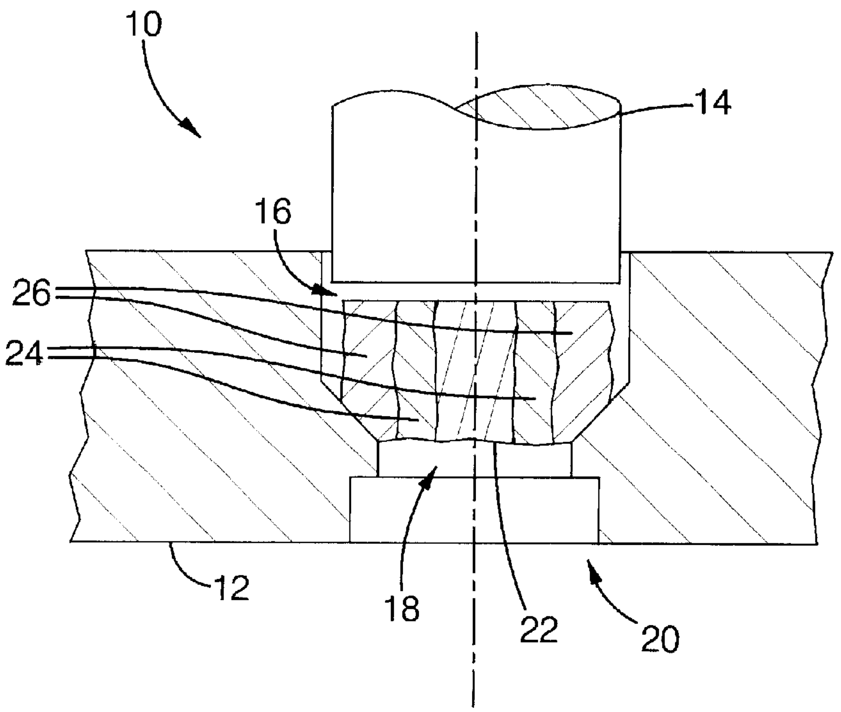
FIG. 1 is a plan view, partially in section, of the die portion of a rod extruder in accordance with the present invention.

An extrusion machine 10 in accordance with the present invention is shown in FIG. 1. The extruder 10 comprises a container body 12 having a chamber 16 for holding material, a die 18, and an opening 20. A hydraulically operated punch 14 is sized to fit tightly in the chamber 16. During operation, the punch 14 is moved into the chamber 16 compressing and reducing the material 22,24, 26. High pressure is generated.

Figure 2:
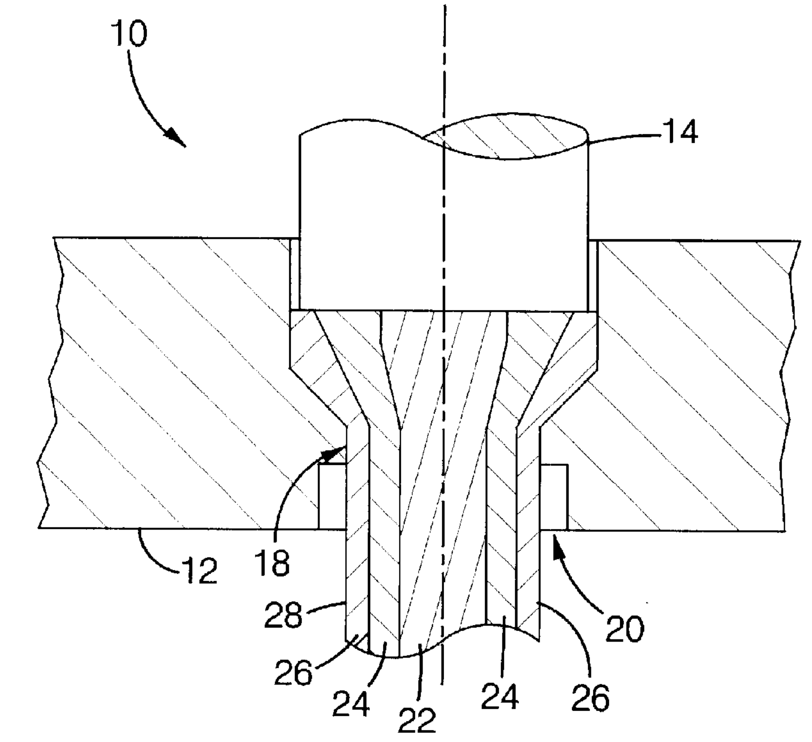
FIG. 2 is a plan view, partially in section, of the extruder shown in FIG. 1 with a portion of the material extruded into a rod.

As seen in FIG. 2, as the punch 14 further compresses the materials 22, 24, 26, so as to cause them to extrude through the die 18 and exit the machine through the opening 20. The high pressure causes the materials 22, 24, 26 to solidify into the rod 28 of the die 18 even after the materials 22, 24, 26 are removed from the extruder 10. Once the extrusion process is completed, the extruded rod 28 is stripped or removed from the extrusion machine. Typically, extrusion machines have a stripping plate (not shown) for removing the extruded rod 28 from the die 18.

Figure 3:
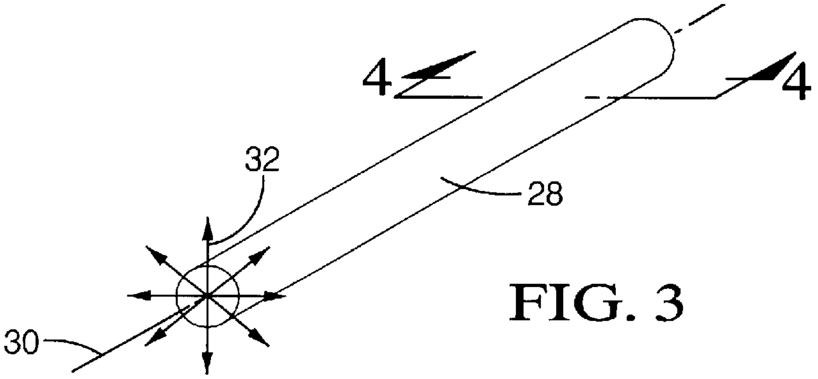
FIG. 3 is a perspective view of a magnet formed from the method of the present invention showing the lines of magnetic force.
Figure 4:
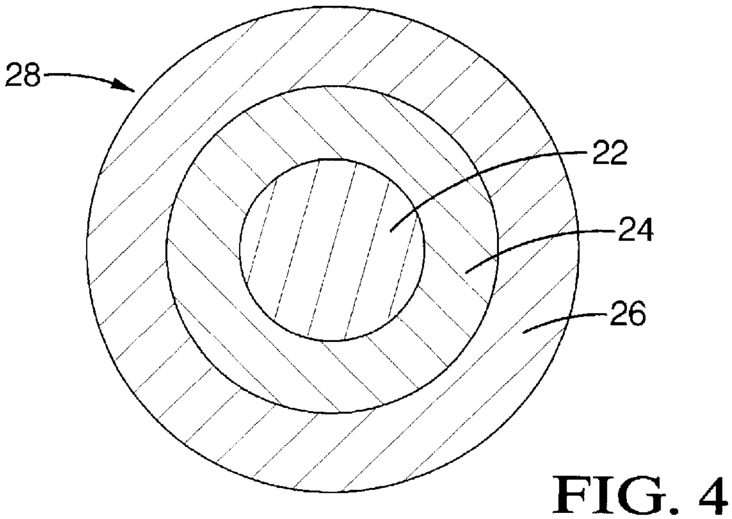
FIG. 4 is a cross section view of the multilayer magnet shown in FIG. 3.

In accordance with the present invention, it has been found that when steel bars or wires are extruded, the reduced product becomes magnetized. Improved magnetic properties are obtained when powdered rare earth magnet material is used. As shown in FIG. 2, a first powder 22, preferably low alloy steel, is injected into the center of chamber 16 with a second powder 24, preferably of $Nd_2Fe_{14}B$ alloy, circumferentially layered around the first 22. An optional third layer 26 of powdered material is preferably layered circumferentially around the $Nd_2Fe_{14}B$ alloy layer 24. When these layered materials 22, 24, 26 are reduced and extruded through the die 18, the resulting extruded form contains multiple layers as seen in FIG. 3 and FIG. 4. The purpose of these layers will be made clearer herein. Once extruded, the resulting rod 28 has radial magnetic properties not displayed in the base materials alone. The radial lines of force 32 are shown in FIG. 3.

As the extrusion process forces the material to flow through the die, the material is compressed. Magnetic domains in the rare earth material will be aligned only when the extrusion process is sufficient to allow the material to flow. The magnetic lines of force will be aligned perpendicular to the direction of the material flow. If the powdered material is merely depressed the resulting product will not exhibit usable magnetic properties. Heat may be applied to the chamber to aid compression. Generally, the materials will be compressed to at least about one-half their original volume. Preferably, the compression will be about one-third or about 30% of the original volume of the powders. Most preferably, the compression will be by a factor of about 16 to 1.

Because the outer layer of the magnet is a powered/plastic material, any conventional machining processes can be used to form the rod thereafter, for example, if a higher degree of concentricity is required, the magnetic rod 28 can be turned or ground. Applications such as brushless DC motors require that a shaft be inserted through the center of the magnet 28. In this case, a hole may be drilled through the inner low alloy steel layer 22 to allow insertion of the shaft. This machinability provides a lower cost and more flexibility over the traditional methods for producing magnets that require specialized sintering, grinding, bonding and cleaning operations.

If machinability of the outer surface of the rod 28 is not required, it is contemplated that the outer layer 26 can be replaced by a coating. A typical coating such as epoxy, nickel, or aluminum chromate would provide the rod 28 with corrosion and oxidation protection.

It should be appreciated that another advantage to the present invention is that the magnetic strength of the rod 28 may be easily altered. By changing the ratio of $Nd_2Fe_{14}B$ alloy 24 to low alloy steel powder 22, in the rod 28, the magnetic properties can be changed to the desired levels. Because the process of extruding metals is well developed, the rod 28 can be manufactured with a high degree of reproducibility. This allows for a product with predictable and consistent magnetic properties.

Figure 5:
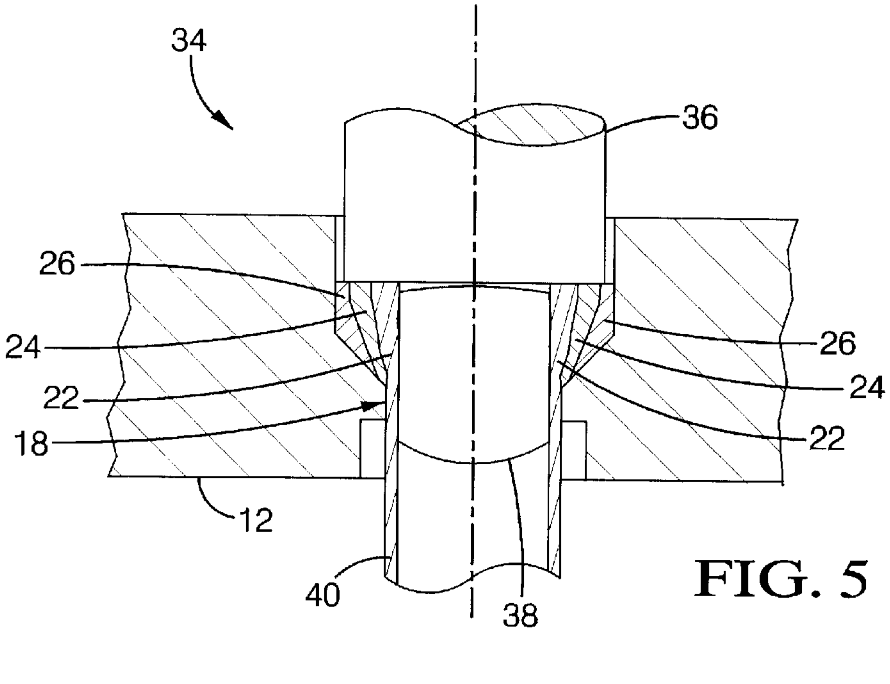
FIG. 5 is a plan view, partially in section, of the die portion of a tube extruder.

Referring to FIG. 5, there is shown an alternate embodiment for a tube extruder 34. In this embodiment, the piston 36 has a mandrel 38 extending through the container body 12 and the die 18. The mandrel 38 has the effect of blocking the flow of material 22, 24, and 26 from the center of the die 18. The result is a multilayer thin wall magnetic tube 40 having an inner wall formed from the low alloy steel powder, an intermediate layer 24 formed from a rare earth metal and an outer layer 26 formed from low alloy steel or other materials depending on applications.

EXAMPLES

An extrusion chamber was injected with 300 grams of low alloy steel, 300 grams of $Nd_2Fe_{14}B$ alloy circumferentially layered around the low alloy steel and 1200 grams low alloy steel circumferentially layered around the $Nd_2Fe_{14}B$ alloy. The materials were extruded with the piston generating 110 to 130 ksi. This extrusion achieved a reduction of 16 to 1 by volume. The resulting extruded rod was 24 inches long and ⅞ inch in diameter and had a lower than targeted specific gravity of 7.64 gm/cc and lower than 30 MGOe of magnetic energy.

While preferred embodiments have been shown and described, various modifications and substitutions may be made thereto without departing from the spirit and scope of the invention. Accordingly, it is to be understood that the present invention has been described by way of illustration only, and such illustrations and embodiments as have been disclosed herein are not to be construed as limiting to the claims.

What is claimed is:

1. An extruded magnetic structure, comprising:

a first layer of low alloy steel compressed powder; and a second layer of rare earth metal compressed powder circumferentially disposed around said first layer.

2. The magnetic structure as in claim 1, further comprising a third layer of compressed power circumferentially disposed around said second layer.

3. The magnetic structure as in claim 2, wherein said third layer is formed of low alloy steel co pressed powder.

4. The magnetic structure as in claim 1, further comprising a coating disposed on said second layer.

5. The magnetic structure as in claim 4, wherein said coating is epoxy, nickel, or aluminum chromate.

6. The magnetic structure as in claim 4, wherein said coating provides corrosion and oxidation protection to the magnetic structure.

7. The magnetic structure as in claim 1, wherein said rare earth metal compressed powder is an $Nd_2Fe_{14}B$ alloy.

8. The magnetic structure as in claim 7, wherein the magnetic structure has radial magnetic properties not displayed in said rare earth metal compressed powder alone.

9. The magnetic structure as in claim 1, wherein said first and second layers form a magnetic rod.

10. The magnetic structure as in claim 1, wherein said first layer flow alloy steel compressed powder includes a hole defined axially through the first that said first and second layers form a magnetic tube.

11. A multi-layer magnetic structure, comprising: an inner layer formed from low alloy steel compressed powder; an intermediate layer formed from a rare earth metal compressed powder; and an outer layer.

12. The multi-layer magnetic structure as in claim 11, wherein said inner layer has a hole defined therethrough such that the multi-layer magnetic structure forms a magnetic tube.

13. The multi-layer magnetic structure as in claim 11, wherein the multi-layer magnetic structure forms a magnetic rod.

14. The multi-layer magnetic structure as in claim 11, wherein said outer layer is formed from low alloy steel compressed powder.

15. The multi-layer magnetic structure as in claim 11, wherein said rare earth metal compressed powder is an $Nd_2Fe_{14}B$ alloy.

16. The multi-layer magnetic structure as in claim 11, further comprising a stainless steel or an aluminum retention cap.

17. An extruded magnetic structure, comprising: an inner layer of low alloy steel compressed powder; and an intermediate layer of are earth element compressed powder circumferentially around said inner layer and in co tact with said inner layer.

18. The magnetic structure of claim 17, further comprising an outer shell formed from compressed powder circumferentially disposed around said intermediate layer and in contact with said intermediate layer.

19. The magnetic structure of claim 18, wherein said rare earth element compressed powder is a $Nd_2Fe_{14}B$ alloy.

20. The magnetic structure of claim 17, wherein the magnetic structure is a magnetic rod or a magnetic tube.

21. The magnetic structure of claim 20, wherein said magnetic rod has a specific gravity of about 7.64 gm/cc.

22. The magnetic structure of claim 17, further comprising a coating over said intermediate layer.

23. The magnetic structure of claim 22, wherein said coating is formed of a clear coat material, an epoxy material, or a plastic material.

* * * * *